United States Patent [19]

Takase et al.

[11] Patent Number: 4,970,719
[45] Date of Patent: Nov. 13, 1990

[54] DIGITAL SIGNAL MULTIPLEXING APPARATUS

[75] Inventors: Akihiko Takase, Tokyo; Yoshitaka Takasaki, Tokorozawa, both of Japan

[73] Assignee: Hitachi, Ltd.

[21] Appl. No.: 233,095

[22] Filed: Aug. 17, 1988

[30] Foreign Application Priority Data

Aug. 28, 1987 [JP] Japan .................................. 62-212744

[51] Int. Cl.$^5$ ............................................... H04J 3/22
[52] U.S. Cl. ......................................... 370/84; 370/112
[58] Field of Search ..................... 370/79, 84, 102, 112

[56] References Cited

U.S. PATENT DOCUMENTS

| | | | |
|---|---|---|---|
| 4,504,943 | 3/1985 | Nagano et al. | 370/79 |
| 4,589,108 | 5/1986 | Billy | 370/84 |
| 4,716,561 | 12/1987 | Angell et al. | 370/84 |
| 4,751,699 | 6/1988 | Tarridec et al. | 370/84 |
| 4,855,999 | 8/1989 | Chao | 370/84 |

Primary Examiner—Douglas W. Olms
Assistant Examiner—Melvin Marcelo
Attorney, Agent, or Firm—Pennie & Edmonds

[57] ABSTRACT

A digital signal multiplexing apparatus comprising variable multiplexers each of which can alter a multiplexed channel format every call in compliance with a subscriber's request, a fixed multiplexer which has a multiplexing capacity integral times as large as the total multiplexing capacity of the variable multiplexers and the multiplexed channel format of which is fixed, and fixed multiplexed signal demultiplexers each of which fixedly demultiplexes signals in a capacity integral times as large as that of each of the variable multiplexers into signals in a capacity equal to the total capacity of the variable multiplexers, wherein the outputs of the fixed multiplexed signal demultiplexers are distributed to the variable multiplexers through a distributing switch network, and the outputs of the variable multiplexers are multiplexed by the fixed multiplexer.

5 Claims, 9 Drawing Sheets

DIGITAL SIGNAL MULTIPLEXING APPARATUS

BACKGROUND OF THE INVENTION

The present invention relates to an apparatus for multiplexing digital signals, and more particularly to a multiplexing apparatus which is well suited to a subscriber line terminal apparatus wherein digital signals from a plurality of terminal equipments are multiplexed and then sent to a subscriber line.

When transmitting a plurality of digital signals each corresponding to different kinds of information, such as data, voice and pictures, by the use of a single subscriber line, prior practice is that a TDM (time division multiplexed) frame which is transmitted on the subscriber line is divided into channels corresponding to the respective information items. A multiplexing apparatus which multiplexes the information items into the corresponding channels of such a TDM frame, is discussed in "Architecture and Technology of the Local Exchange Network in the Broadband ISDN" by H. Bauch et al., issls 86 Proceedings, pp. 29-34. This apparatus is shown in FIG. 2, and the format of the TDM frame in FIG. 3. As indicated in this example, a subscriber line 23 of fixed capacities (in FIG. 2, a downstream capacity of 614 Mb/s and an upstream capacity of 154 Mb/s) has been offered to each subscriber, and information signals from terminal equipment have been multiplexed in the respective channels 32, 33-33''' and 34-34''' of the predetermined frame format. The number 31 denotes a frame alignment signal.

In the prior art, the subscriber must use the subscriber line of the fixed transmission capacities irrespective of required transmission capacities. Moreover, the sorts and number of the terminal equipment to be used are limited by the channel format of the multiplexed frame 30, as shown in FIG. 3.

In actuality, the transmission capacities which are required by the individual subscribers are of infinite variety, and even the same subscriber might expand small capacities into large ones. In the prior art, such multifarious requests cannot be met economically.

In regard to the terminal equipment to be used, some subscribers favor ones of small capacities in large numbers, while others might desire ones of large capacities. Furthermore, even the same subscriber might use both the terminal equipment of small and large capacities separately according to times. The prior art cannot economically accommodate these flexible requirements either.

SUMMARY OF THE INVENTION

An object of the present invention is to solve the problems of the prior-art example as mentioned above, and to provide a multiplexing apparatus which economically realizes transmission capacities and multiplexed channel formats required by individual subscribers.

Another object is to provide a multiplexing apparatus with which, when transmission capacities are to be expanded, various expansions conforming to subscribers' requests can be readily performed.

A further object is to provide a multiplexed signal demultiplexing apparatus wherein signals transmitted from an exchange by a subscriber line are demultiplexed and then distributed to respective terminal equipment, the apparatus meeting the aforementioned features.

The above objects are accomplished in such a way that signals from a plurality of terminal equipments are arranged in basic signal frames so as to be variable every call, and that the plurality of basic signal frames are arranged in a transmission line frame so as to be variable every call.

More specifically, these objects are achieved by adopting a multiplexing apparatus comprising variable multiplexers each of which can alter a multiplexed channel format every call in conformity with a subscriber's request, a fixed multiplexer which has a multiplexing capacity integral times as large as the total multiplexing capacity of the variable multiplexers and the multiplexed channel format of which is fixed, and fixed multiplexed signal demultiplexers each of which fixedly demultiplexes signals in a capacity integral times as large as that of each of the variable multiplexers into signals in a capacity equal to the total capacity of the variable multiplexers, wherein the outputs of the fixed multiplexed signal demultiplexers are distributed to the variable multiplexers through a distributing switch network, and the outputs of the variable multiplexers are multiplexed by the fixed multiplexer; and further, by turning the aforementioned constituent circuits into modules so as to construct the multiplexing apparatus in a building block configuration.

Transmission on a subscriber line is set at a capacity which is integral times as large as a basic transmission capacity R1. The capacity R1 is the same as the total multiplexing capacity of the variable multiplexers.

Information signals from terminal equipment having an information transmission capacity, exceeding R1 are divided with R1 being the unit. The divided information signals from the plurality of terminal equipments are distributed to the plurality of variable multiplexers by the distributing switch network. The number of the variable multiplexers is equal to a number which is obtained by dividing the transmission capacity of the subscriber line by R1.

The distributing switch network selects the variable multiplexers in correspondence with the channel formats of the subscriber's requests changing call by call, and the variable multiplexers arrange the distributed information signals from the plurality of terminal equipment, on a multiplexed frame having the capacity R1.

The multiplexed frames arranged as stated above are further multiplexed by the fixed multiplexer so as to construct the TDM frame of the transmission line.

In the above way, it can be readily realized to change the channel formats of the multiplexed frames in compliance with the requests of subscribers.

Further, a variable multiplexer which requires a complicated control can be realized in such a way that variable multiplexer modules each having the total multiplexing capacity R1 are prepared in a number corresponding to a transmission line capacity. Thus, it is readily permitted and economical or expand to set the transmission capacity on the basis of a subscriber's request.

In addition, a multiplexed signal demultiplexing apparatus can be realized by replacing the fixed multiplexer with a fixed multiplexed signal demultiplexer, the variable multiplexer with a variable multiplexed signal demultiplexer, and the fixed multiplexed signal demultiplexer with a fixed multiplexer.

DESCRIPTION OF THE PREFERRED EMBODIMENTS

Figure 1:
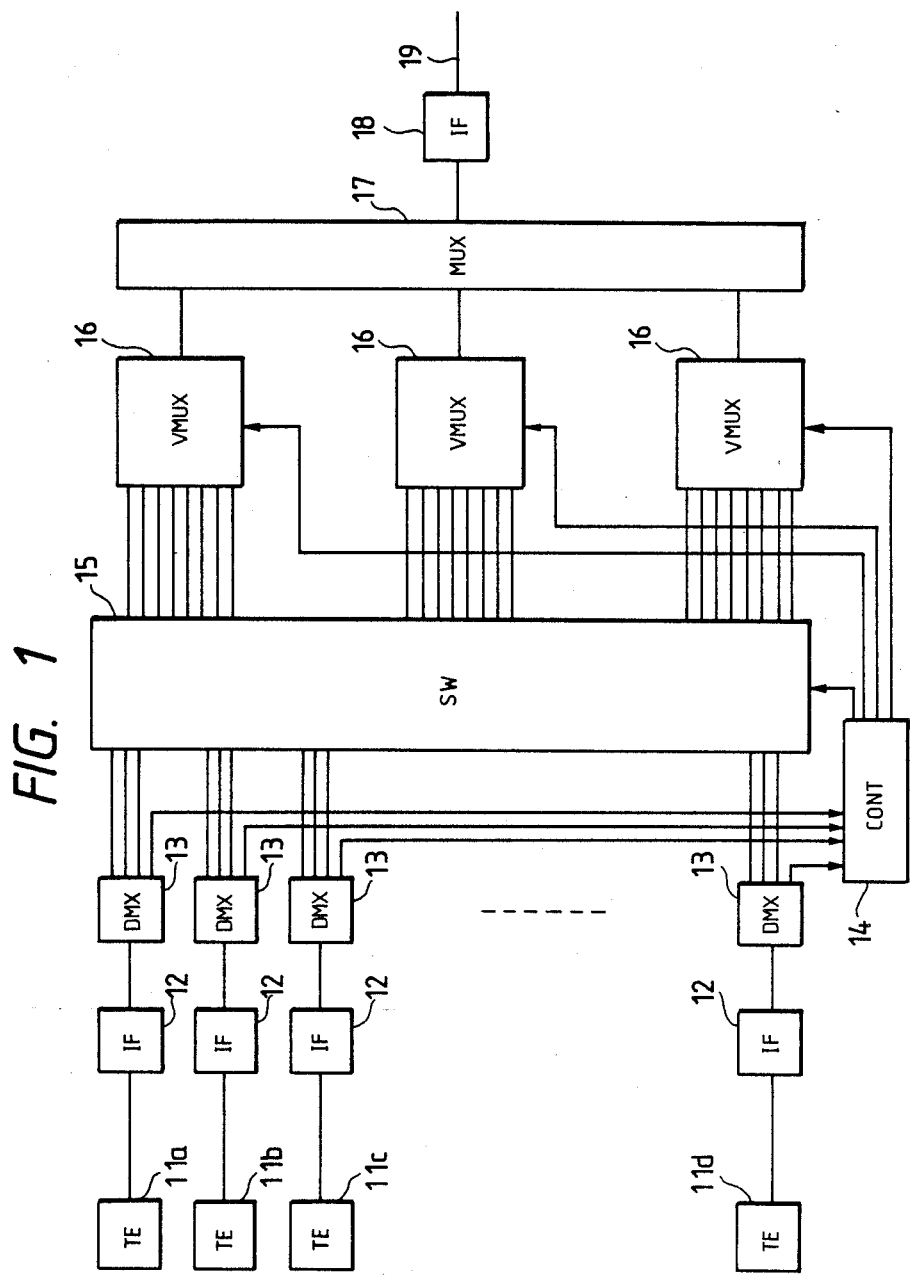
FIG. 1 is a diagram showing an embodiment illustrative of the fundamental construction of the present invention.
Figure 2:
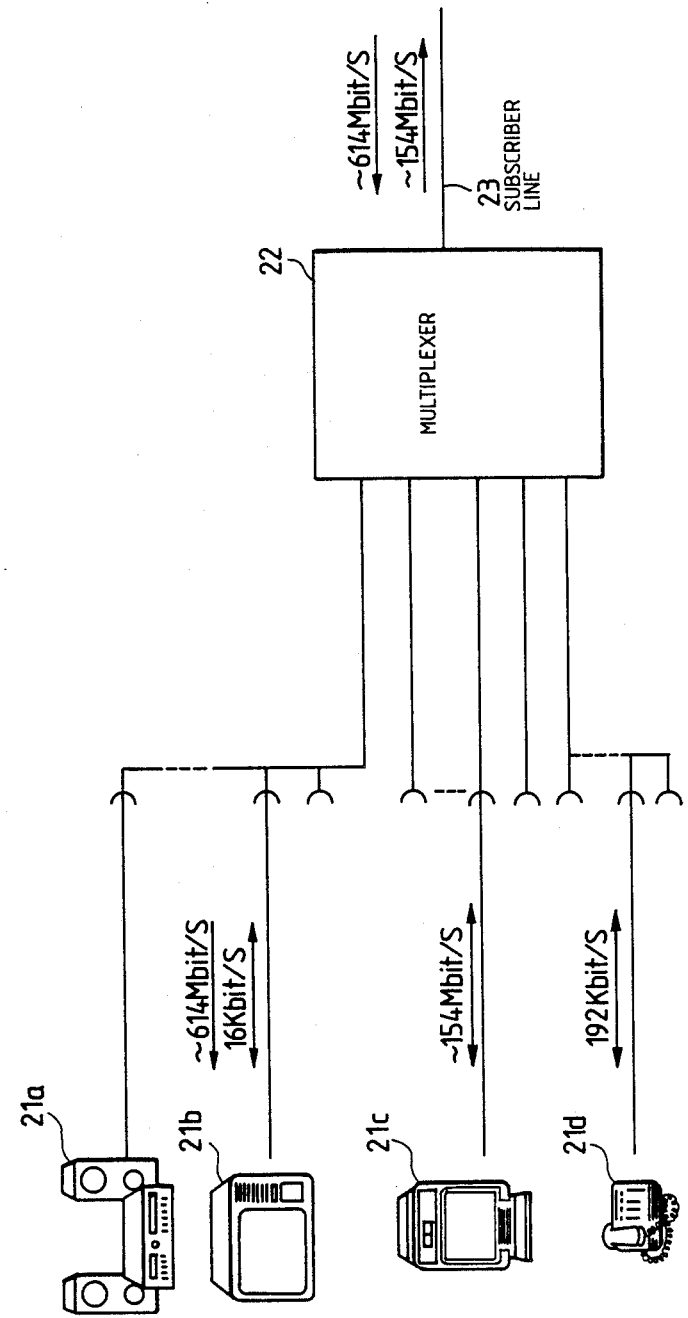
FIG. 2 is a diagram showing an example of a prior-art multiplexing apparatus.
Figure 3:
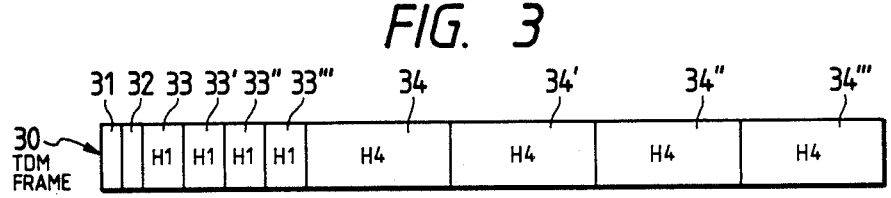
FIG. 3 is a diagram showing a multiplexed frame format for use in the prior-art apparatus.

Now, embodiments of the present invention will be described with reference to the drawings. FIG. 1 shows one embodiment illustrative of the fundamental construction of the present invention. The multiplexing apparatus in the figure multiplexes information signals from a plurality of terminal equipment (11a-11d), and delivers them from a transmission line interface 18 to a subscriber line 19.

Each of the terminal equipment is assumed to send an information signal in a capacity which is at most three times as large as a basic multiplexing capacity R1. The subscriber line 19 is also assumed to have a transmission capacity three times as large as R1.

Figure 4A:
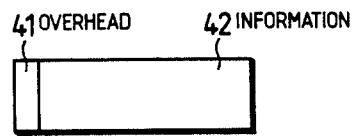
FIGS. 4A-4C are diagrams each showing a frame format for use in the present invention.
Figure 4B:
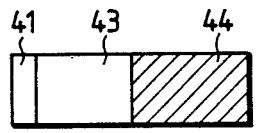
Figure 4C:
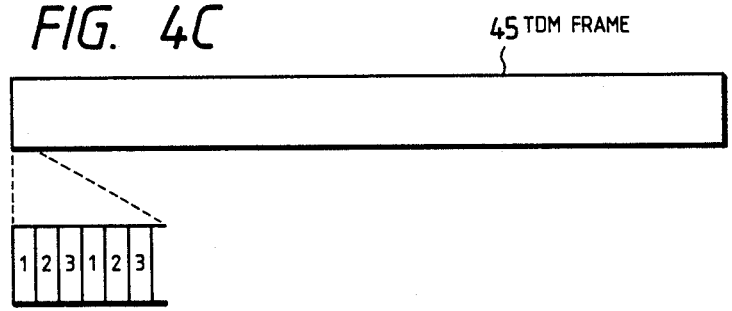

The information signal sent from the terminal equipment 11 is applied from a terminal equipment interface 12 to the multiplexing apparatus. Timing extraction, code conversion, etc. are performed in the terminal equipment interface 12. The information signal converted into the internal signal of the apparatus in the terminal equipment interface 12 is input to a fixed multiplexed signal demultiplexer 13. The fixed multiplexed signal demultiplexer 13 supplies one of the three output lines thereof with a signal having an information capacity equal to R1 as shown in FIG. 4A (in which numeral 41 indicates an overhead, and numeral 42 information), or a signal having an information capacity less than R1 as shown in FIG. 4B (in which numeral 43 indicates information, and numeral 44 dummy bits). In addition, a signal having an information capacity larger than R1 has been multiplexed in bit interleave fashion with R1 as a unit as shown in FIG. 4C (in which numeral 45 indicates a TDM time division multiplexed) frame), and it is divided into the frames as shown in FIG. 4A by the multiplexed signal demultiplexer 13, these frames being delivered to the three or two output lines.

A frame alignment signal, a signal indicating the magnitude of an information capacity included in the pertinent frame, the sequence No. of information extending over a plurality of R1 frames, etc. are contained in the overhead 41 of the frame format in FIGS. 4A or 4B, and they are separated by the fixed multiplexed signal demultiplexer 13 and then sent to a controller 14.

The controller 14 is monitoring the service state of the subscriber line 19 with call setting information contained in the overhead, and it controls a distributing switch network 15 and three variable multiplexers 16 on the basis of the service state.

Under the control of the controller 14, the distributing switch network 15 distributes the information signals from the plurality of terminal equipments 11 to the three variable multiplexers 16. The distributed outputs to each of the variable multiplexers are required in the number of the terminal equipments. In FIG. 1, a case of eight terminal equipments is depicted. In this case, the distributing switch network 15 has 24×24 lattice switches. The lattice number of the lattice switches can also be enlarged in anticipation of the expansion of the information capacity in the future. The outputs from the distributing switch network 15 are controlled by the controller 14 so that the summation of eight signals to be input to one variable multiplexer 16 may become within the capacity R1.

The variable multiplexer 16 arranges the inputs from the distributing switch network 15 within the frame as shown in FIG. 4A on the basis of the control of the controller 14. Besides, the type and capacity of information included in the pertinent frame, a frame alignment signal, sequence No., etc. are written into the overhead part 41.

The outputs of the three variable multiplexers 16 are multiplexed in the bit interleave form by a fixed multiplexer 17. The multiplexed signal is delivered from the transmission line interface 18 to the subscriber line 19.

Figure 8:
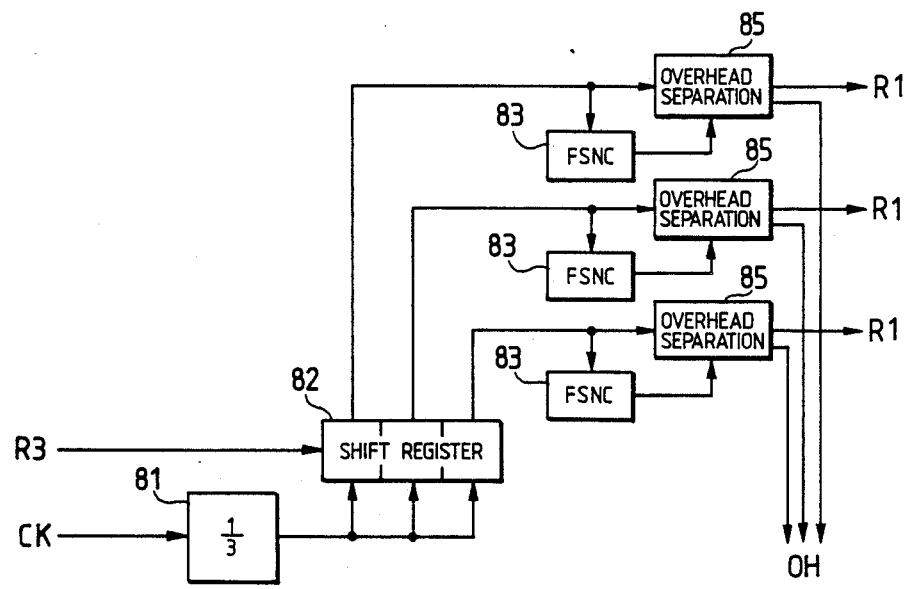
FIGS. 8-10 are diagrams each showing an example of a circuit which constitutes the multiplexing apparatus according to the present invention.

FIG. 8 shows the functional block configuration of the fixed multiplexed signal demultiplexer 13. A signal R3 having a multiplexing capacity three times as large as the capacity R1, and a clock CK extracted by the terminal equipment interface 12 are input. The signal R3 is written into a shift register 82 at the rate of the clock CK. This clock CK has its frequency divided into ⅓ by a frequency divider 81, thereby to become the read clock of the shift register 82. Each of the signals divided by 3 has the capacity R1. Frames are synchronized using frame alignment patterns in the overheads 41, by frame synchronizers 83, and the overhead is separated every R1 frame by an overhead separator 85.

Figure 9:
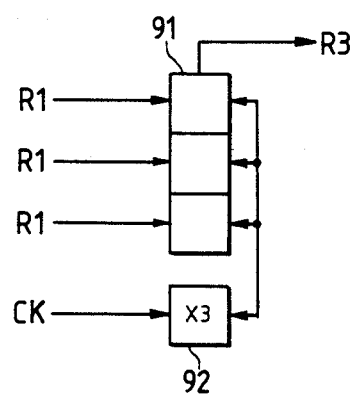

FIG. 9 shows the functional blocks of the fixed multiplexer 17. Signals each having the capacity R1 as applied from the left are written into a shift register 91 with the clock having the same rate as that of the signal R1, and are read out with a clock obtained by multiplying the clock CK by means of a frequency multiplier 92. Thus, the signal R3 in which the R1 frames are multiplexed in bit interleave fashion is produced.

Figure 10:
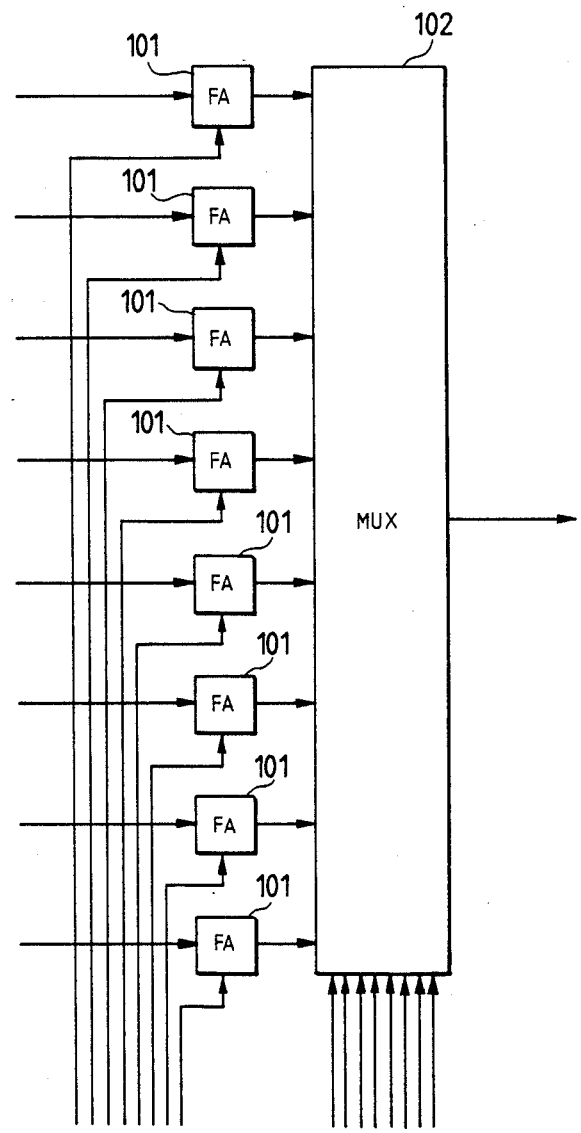

FIG. 10 is a diagram showing the functional block configuration of the variable multiplexer 16.

Signals from the distributing switch network 15 are respectively written into frame aligners 101 at the rate R1. The written information items are read out at predetermined timings and the read R1 with the control signals of the controller 14. The read information items are changed-over and multiplexed by a multiplexer 102 in synchronism with the timings. Control signal lines for controlling the frame aligners 101 or the multiplexer 102 are required in a number corresponding to the number of the terminal equipment. They are expressed by a single line in FIG. 1.

Such a variable multiplexer can be realized even when the frame aligners are replaced with a phase adjusting circuit such as a variable-length shift register.

According to this embodiment, each of all the terminal equipment interfaces 12 can handle the information signal whose capacity is three times as large as the capacity R1. This brings forth the effect that information items from information at a low rate below R1 to information at a high rate three times as high as R1 can be transmitted by any of the interfaces.

Figure 5:
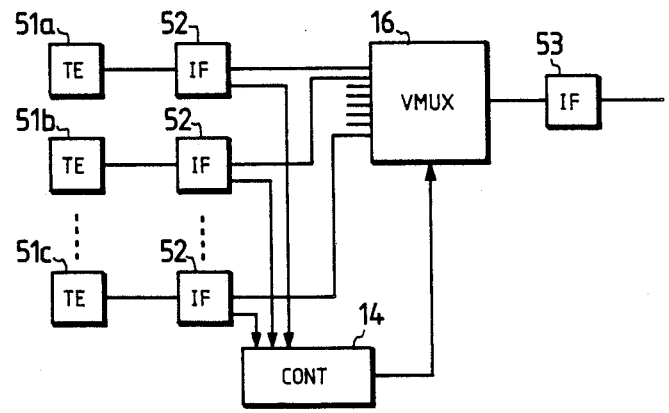
FIGS. 5-7 and FIG. 12 are diagrams each showing another embodiment of the present invention.

FIG. 5 shows another embodiment of the present invention. This embodiment indicates the case of a subscriber where only terminal equipment each having a transmission rate of at most R1 are possessed and where the transmission rate of a subscriber line is R1. In a case where such a subscriber introduces a terminal equipment at a transmission rate of 3×R1 anew, two variable multiplexers, one fixed multiplexer as well as one fixed multiplexed signal demultiplexer, one transmission line as well as one terminal equipment interface, and a distributing switch network may be added. It is only a transmission line interface 53 that becomes unnecessary at the time of the expansion in the apparatus configuration in FIG. 5, and the expansion can be efficiently implemented.

Figure 6:
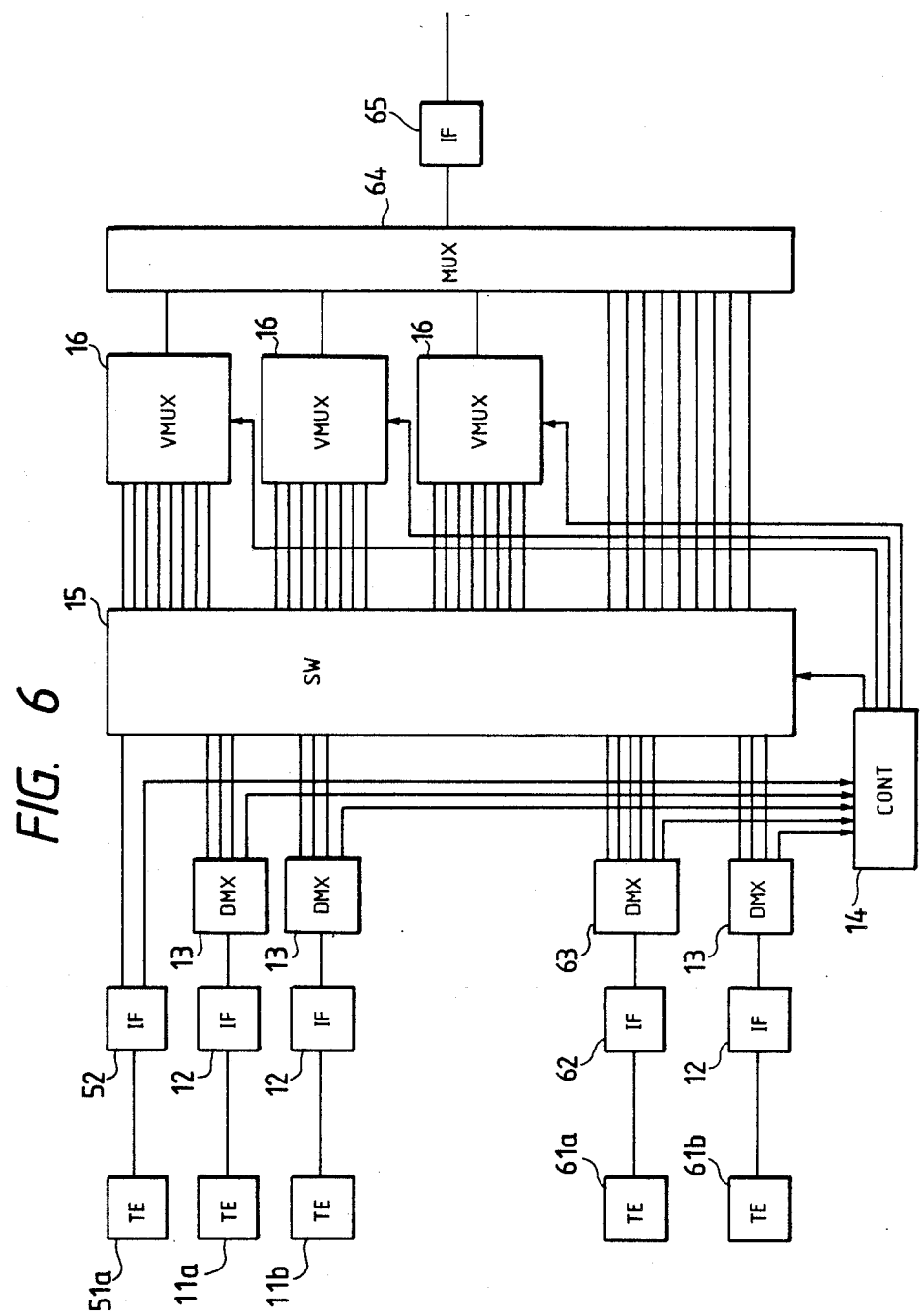

FIG. 6 shows another embodiment of the present invention. In this embodiment, a subscriber line has a transmission capacity of 12×R1. The part of each terminal equipment interface 12 corresponding to a capacity of 8×R1 shall be accessed only in R1 unit. Besides, a terminal equipment 61a requiring a transmission rate of 6×R1 and a terminal equipment 61b requiring a transmission rate of 3×R1 are used.

In this embodiment, some of the outputs of a distributing switch network 15 are directly applied to a fixed multiplexer 64 without passing a variable multiplexer 16. A signal from any terminal equipment, which is satisfactorily accessed in R1 unit and which need not divide an R1 frame for use, has such a path selected by the distributing switch network 15 and is multiplexed into a TDM frame by the fixed multiplexer 64. Also, a signal which is not the signal from the terminal equipment accessed in R1 unit can be processed in such a way that a part corresponding to R1 in the signal divided by a fixed multiplexed signal demultiplexer 13 is not passed through the variable multiplexer 16, and that only a part outside R1 is multiplexed with signals from other terminal equipment by the variable multiplexer 16.

According to this embodiment, the number of the variable multiplexers 16 can be decreased in accordance with the sorts of the terminal equipment used by a subscriber, to bring forth the advantage that the construction of the apparatus is simplified.

Figure 7:
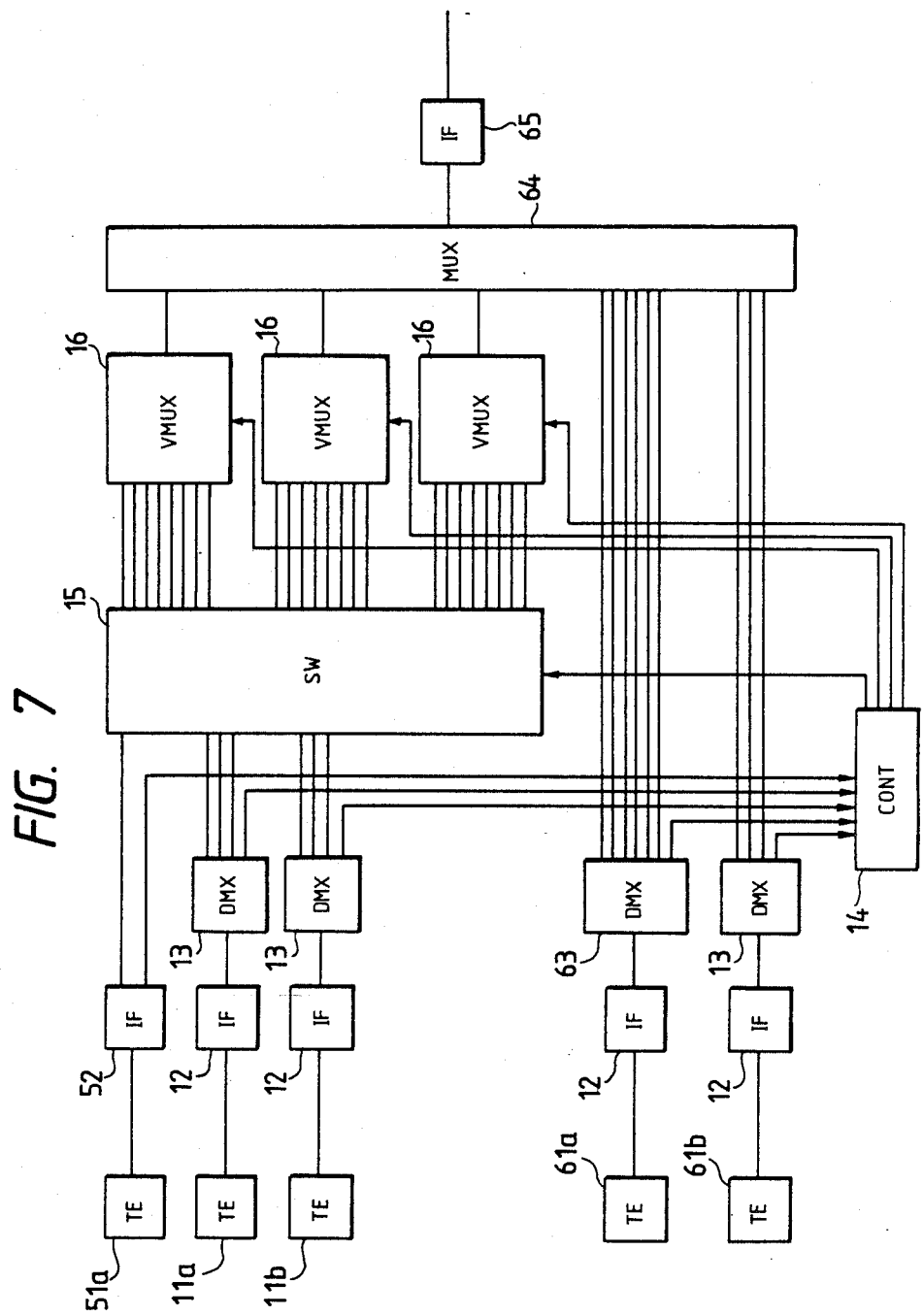

FIG. 7 shows another embodiment of the present invention. In this embodiment, information signals from a terminal equipment 61a requiring a transmission capacity of 6×R1 and a terminal equipment 61b requiring a transmission capacity of 3×R1 are respectively divided by multiplexed signal demultiplexers 63 and 13, whereupon they are directly input to a fixed multiplexer 72 without passing through a distributing switch network 15. In this construction, the terminal equipment 61a and 61b are coupled to a subscriber line on any occasion.

This embodiment has the effect that the transmission capacity can be expanded beyond the scale of the distributing switch network 15.

Figure 12:
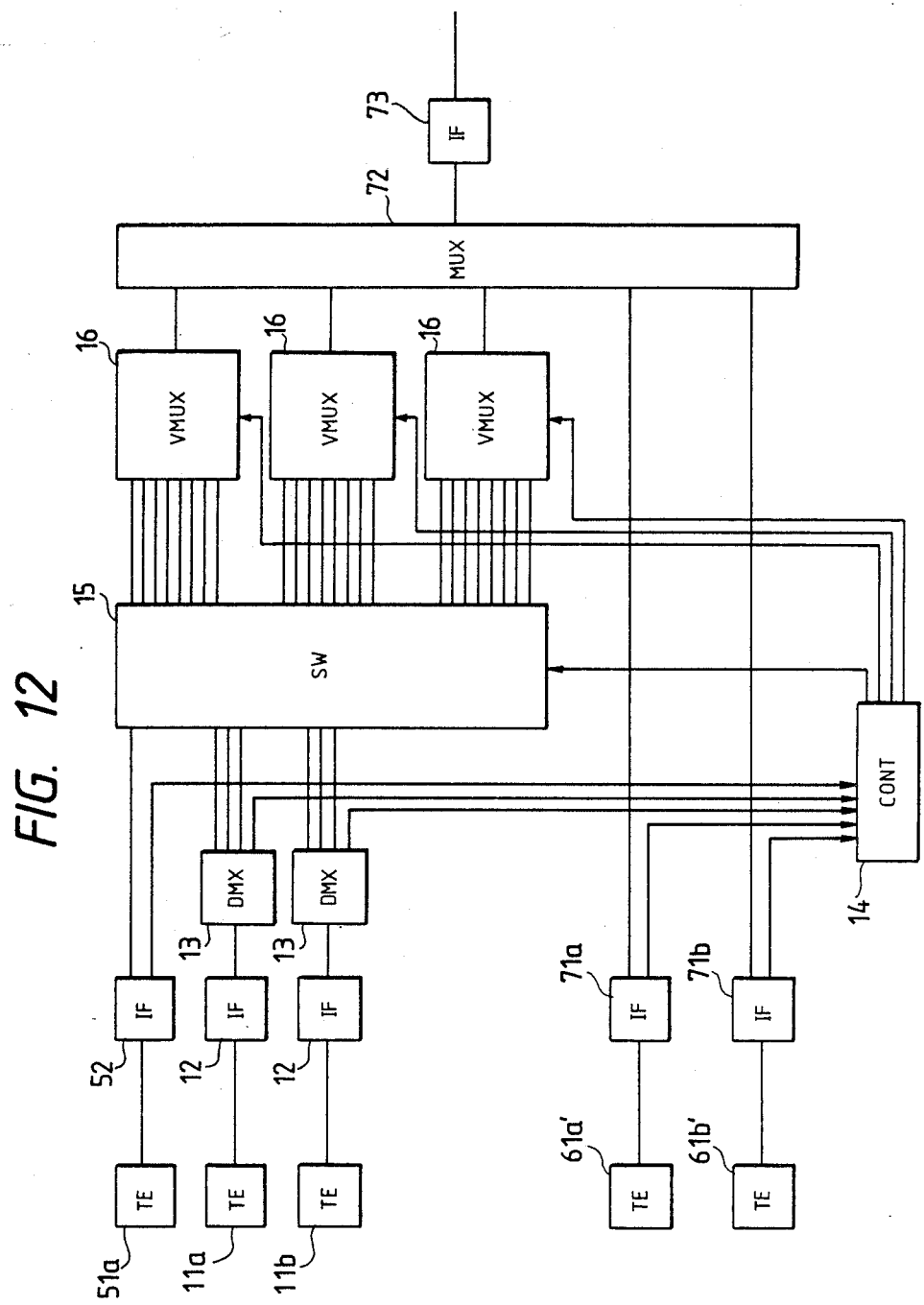

FIG. 12 shows an embodiment in the case where the terminal equipment 61a and 61b in FIG. 7 are respectively terminal equipment 61a' and 61b' each of which delivers a signal as shown in FIG. 4C wherein a plurality of R1 frames are multiplexed in bit interleave fashion. The signals from these terminal equipment are directly input to the fixed multiplexer 72.

According to this embodiment, the fixed multiplexed signal demultiplexers 63 and 13 are dispensed with, to bring forth the effect that the construction of the apparatus is simplified.

Figure 11:
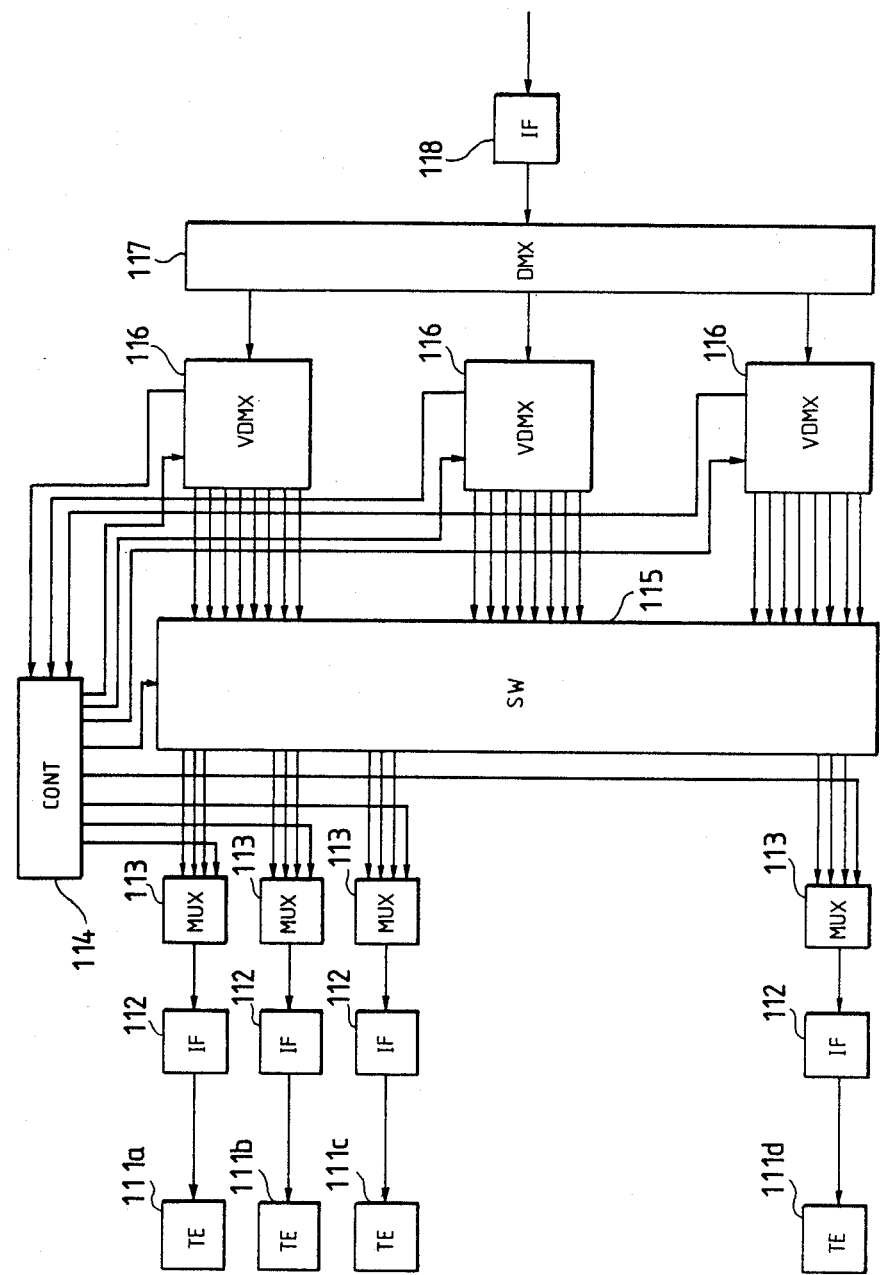
FIG. 11 is a diagram showing an example in which the present invention is applied to a multiplexed signal demultiplexing apparatus.

FIG. 11 shows an embodiment of the present invention concerning a multiplexed signal demultiplexing apparatus. A downstream subscriber line signal applied via a transmission line interface 118 is demultiplexed into signals at the rate R1 by a fixed multiplexed signal demultiplexer 117. Each of the demultiplexed signals is further demultiplexed in correspondence with respective terminal equipment 111 by variable multiplexed signal demultiplexers 116. This operation is controlled by a controller 14 on the basis of the contents of overhead parts separated by the variable multiplexed signal demultiplexers 116 beforehand. The demultiplexed signals are distributed to fixed multiplers 113 corresponding to the terminal equipment 111 by means of a distributing switch network 115. The fixed multiplexers 113 multiplex the distributed signals on the basis of sequence Nos., etc. contained in the overhead parts, and add new overhead information if necessary. The resulting signals are transmitted to the terminal equipment 111 through terminal equipment interfaces 112.

According to this embodiment, the distributing switch network 115, fixed multiplexers 113, fixed multiplexed signal demultiplexer 117, etc. which are equivalent to those shown in FIG. 1 can be used, to bring forth the effect that the circuits can be made common to those of the multiplexing apparatus.

In the embodiments thus far described, the case of the eight terminal equipment has been explained. It is needless to say that the number of the terminal equipment can be more increased or be decreased. In addition, the various concepts of the embodiments elucidated as to the multiplexing apparatuses are applicable to the multiplexed signal demultiplexing apparatus.

Moreover, when the basic multiplexing capacity R1 in the present invention is selected at such an extent of rate that signals can be processed by a device of low power consumption such as CMOS LSI, there is the effect that the multiplexing apparatus and multiplexed signal demultiplexing apparatus for signals at a higher rate are facilitated to have their sizes reduced and their power consumptions lowered.

As described above, according to the present invention, a multiplexing apparatus and a multiplexed signal demultiplexing apparatus in which channel formats are made variable every call in compliance with subscribers' requests can be realized as the combination of fixed multiplexers, a distributing switch network, variable multiplexers and fixed multiplexed signal demultiplexers. This produces the effect that the various requests of subscribers can be readily coped with in both the points of a transmission capacity and a multiplexed channel format.

Further, since the respective constituent circuits can be turned into modules with a basic multiplexing capacity as a unit, enlarging a transmission capacity is permitted merely by exchanging a transmission line interface and adding necessary modules. This produces the effect that an expansion conforming to the necessity of a subscriber can be economically implemented.

What is claimed is:

1. A digital signal multiplexing apparatus for multiplexing digital signals from a plurality of terminal equipments in time division fashion and delivering the multiplexed signals to a transmission line, comprising:

means for converting the digital signal from each of said terminal equipments so as to have the same rate as a basic signal rate, in such a way that among said digital signals from the respective terminal equipment, a signal at a rate higher than the predetermined basic signal rate is divided, while a signal at a rate lower than the basic signal rate has at least one dummy bit added thereto;

means for distributing the outputs of said converting means in a variable fashion in response to types of digital signals from said respective terminal equipments;

at least one means for arranging the outputs of said distributing means in time division multiplexed frames of the basic signal rate so that the aggregate signal rate to be input to each of said arranging means falls within a basic transmission capacity; and means for multiplexing outputs of said arranging means in time division fashion.

2. A method for multiplexing digital signals from a plurality of terminal equipments in time division fashion and delivering the multiplexed signals to a transmission line comprising the steps of:

converting the digital signal from each of said terminal equipments so as to have the same rate as a basic signal rate in such a way that among said digital signals from the respective terminal equipment, a signal at a rate higher than the predetermined basic signal rate is divided, while a signal at a rate lower than the basic signal rate has at least one dummy bit added thereto;

distributing the converted signal in a variable fashion in response to types of digital signals from the respective terminal equipment;

arranging the distributed signals in time division multiplexed frames of the basic signal rate so that the aggregate rate of the distributed signals to be input falls within a basic transmission capacity; and multiplexing the arranged signals in time division fashion.

3. A digital signal multiplexing apparatus for multiplexing digital signals from a plurality of terminal equipments in time division fashion and delivering said multiplexed signals to a transmission line, comprising:

means for converting the digital signal from each of said terminal equipments so as to have the same rate as a basic signal rate, in such a way that among said digital signals from the respective terminal equipment, a signal at a rate higher than the predetermined basic signal rate is divided, while a signal at a rate lower than the basic signal rate has at least one dummy bit added thereto;

means for distributing the outputs of said converting means in a variable fashion in response to types of digital signals from said respective terminal equipment;

means for arranging the outputs of said distributing means in time division multiplexed frames of the basic signal rate; and means for multiplexing outputs of said arranging means in time division fashion, wherein some of outputs of said distributing means are directly input to said multiplexing means without passing through any of said arranging means.

4. A digital signal multiplexing apparatus for multiplexing digital signals from a plurality of terminal equipments in time division fashion and delivering said multiplexed signals to a transmission line, comprising:

means for converting the digital signal from each of said terminal equipments so as to have the same rate as a basic signal rate, in such a way that among said digital signals from the respective terminal equipment, a signal at a rate higher than the predetermined basic signal rate is divided, while a signal at a rate lower than the basic signal rate has at least one dummy bit added thereto;

means for distributing the outputs of said converting means in a variable fashion in response to types of digital signals from said respective terminal equipments;

means for arranging the outputs of said distributing means in time division multiplexed frames of the basic signal rate; and means for multiplexing outputs of said arranging means in time division fashion, wherein some of said outputs of said converting means are directly input to said multiplexing means without passing through any of said distributing means and said arranging means.

5. A digital signal multiplexing apparatus for multiplexing digital signals from a plurality of terminal equipments in time division fashion and delivering said multiplexed signals to a transmission line, comprising:

means for converting the digital signal from each of said terminal equipments so as to have the same rate as a basic signal rate, in such a way that among said digital signals from the respective terminal equipment, a signal at a rate higher than the predetermined basic signal rate is divided, while a signal at a rate lower than the basic signal rate has at least one dummy bit added thereto;

means for distributing the outputs of said converting means in a variable fashion in response to types of digital signals from said respective terminal equipments;

means for arranging the outputs of said distributing means in time division multiplexed frames of the basic signal rate; and means for multiplexing outputs of said arranging means in time division fashion, wherein some of the digital signals from said respective terminal equipment are directly input to said multiplexing means.

* * * * *